(12) United States Patent
de Cesare et al.

(10) Patent No.: US 8,271,812 B2
(45) Date of Patent: Sep. 18, 2012

(54) HARDWARE AUTOMATIC PERFORMANCE STATE TRANSITIONS IN SYSTEM ON PROCESSOR SLEEP AND WAKE EVENTS

(75) Inventors: Josh P. de Cesare, Campbell, CA (US); Jung Wook Cho, Cupertino, CA (US); Toshi Takayanagi, San Jose, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 12/756,006

(22) Filed: Apr. 7, 2010

(65) Prior Publication Data

US 2011/0252251 A1    Oct. 13, 2011

(51) Int. Cl.
*G06F 1/00* (2006.01)
*G06F 1/26* (2006.01)
*G06F 3/038* (2006.01)
*G06F 3/00* (2006.01)
*G09G 3/18* (2006.01)
*G11C 5/14* (2006.01)
*H04M 1/00* (2006.01)

(52) U.S. Cl. ........ 713/300; 713/320; 713/323; 713/324; 345/52; 345/211; 365/227; 455/574; 719/321

(58) Field of Classification Search ............ 713/300, 713/320, 323, 324; 345/52, 211; 365/227; 455/574; 719/321
See application file for complete search history.

(56) References Cited

U.S. PATENT DOCUMENTS

| | | | |
|---|---|---|---|
| 5,813,022 A | | 9/1998 | Ramsey |
| 6,128,747 A | * | 10/2000 | Thoulon ............ 713/330 |
| 6,510,525 B1 | * | 1/2003 | Nookala et al. ............ 713/324 |
| 6,535,798 B1 | | 3/2003 | Bhatia et al. |
| 6,665,802 B1 | * | 12/2003 | Ober ............ 713/320 |
| 6,823,516 B1 | | 11/2004 | Cooper |

(Continued)

FOREIGN PATENT DOCUMENTS

EP    0855718    7/1998

(Continued)

OTHER PUBLICATIONS

Combined Search and Examination Report in Application No. GB1105852.6 issued Aug. 1, 2011.

(Continued)

*Primary Examiner* — Stefan Stoynov
(74) *Attorney, Agent, or Firm* — Lawrence J. Merkel; Meyertons, Hood, Kivlin, Kowert & Goetzel, P.C.

(57) ABSTRACT

In an embodiment, a power management unit (PMU) may automatically transition (in hardware) the performance states of one or more performance domains in a system. The target performance states to which the performance domains are to transition may be programmable in the PMU by software, and software may signal the PMU that a processor in the system is to enter the sleep state. The PMU may control the transition of the performance domains to the target performance states, and may cause the processor to enter the sleep state. In an embodiment, the PMU may be programmable with a second set of target performance states to which the performance domains are to transition when the processor exits the sleep state. The PMU may control the transition of the performance domains to the second targeted performance states and cause the processor to exit the sleep state.

11 Claims, 5 Drawing Sheets

U.S. PATENT DOCUMENTS

| | | | |
|---|---|---|---|
| 7,369,815 B2 * | 5/2008 | Kang et al. | 455/73 |
| 7,590,473 B2 | 9/2009 | Wyatt | |
| 2003/0061383 A1 | 3/2003 | Zilka | |
| 2005/0064829 A1 * | 3/2005 | Kang et al. | 455/127.1 |
| 2006/0259800 A1 * | 11/2006 | Maejima | 713/300 |
| 2007/0150759 A1 | 6/2007 | Srinivasan et al. | |
| 2007/0234078 A1 | 10/2007 | Nguyen | |
| 2008/0168285 A1 | 7/2008 | de Cesare et al. | |
| 2008/0307245 A1 | 12/2008 | de Cesare et al. | |
| 2009/0063715 A1 | 3/2009 | de Cesare et al. | |
| 2009/0204837 A1 | 8/2009 | Raval | |
| 2010/0211700 A1 | 8/2010 | de Cesare et al. | |

FOREIGN PATENT DOCUMENTS

| | | |
|---|---|---|
| GB | 2472050 | 1/2011 |

OTHER PUBLICATIONS

International Search Report and Written Opinion from PCT/US 11/31358, mailed Jun. 13, 2011, Apple Inc., 12 pages.

* cited by examiner

HARDWARE AUTOMATIC PERFORMANCE STATE TRANSITIONS IN SYSTEM ON PROCESSOR SLEEP AND WAKE EVENTS

BACKGROUND

1. Field of the Invention

This invention is related to the field of systems including processors and peripheral devices, and managing power consumption in such systems.

2. Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

Clock gating is often used to reduce dynamic power consumption in an integrated circuit, disabling the clock to idle circuitry and thus preventing switching in the idle circuitry. Additionally, some integrated circuits have implemented power gating to reduce static power consumption (e.g. consumption due to leakage currents). With power gating, the power to ground path of the idle circuitry is interrupted, reducing the leakage current to near zero.

Clock gating and power gating can be effective power conservation mechanisms. However, in some cases, these mechanisms are not as effective as desired. For example, systems that include processors can cause the processors to enter a sleep state to conserve power. While the processor is in the sleep state, other components in the system are still active, and often are operating at performance levels that support the active processors. When the processors are in the sleep state, these other components need not be operating at such a high performance level. Similarly, when the processors are awakened from the sleep state, the performance level at which the processors and other components need to operate to support the activities being performed by the system may be different than the performance level prior to the processor entering the sleep state.

The sleep/wake transitions of the processors and other components are changed under software control. The software executes on the processors, and thus changing the performance levels of the processors and other components can affect the amount of time required to execute the software. These effects impact the efficiency of the transition, impacting the power conserved and the performance of the application. Furthermore, the software execution time can affect how often the processor is transitioned to the sleep state, and the amount of reduced performance that can be tolerated in the rest of the system.

SUMMARY

In an embodiment, a power management unit may be configured to automatically transition (in hardware) the performance states of one or more performance domains in a system. The target performance states to which the performance domains are to transition may be programmable in the power management unit by software. Additionally, the software may signal the power management unit that a processor in the system is to enter the sleep state. Alternatively, the power management unit may monitor the processor to detect that the processor is entering the sleep state or has entered the sleep state. The power management unit may be configured to control the transition of the performance domains to the target performance states, and may also cause the processor to enter the sleep state in some embodiments. In an embodiment, the power management unit may be programmable with a second set of target performance states to which the performance domains are to transition when the processor exits the sleep state. The power management unit may be configured to control the transition of the performance domains to the second targeted performance states and may also cause the processor to exit the sleep state in some embodiments.

In one embodiment, the transition of the performance domains into different target states may be more rapid when controlled by the power management unit than may be possible with software control. Accordingly, the power conservation may be more efficient than a purely software-controlled implementation, and the performance of applications executing in the system may also be positively affected. Additionally, the configureability of the performance states may permit more fine-grained control of the performance level in the system and thus may permit additional power savings. In some cases, the performance states may be reduced further than would be possible in the software-controlled implementation, because the time required for the software to execute while the system is in the lower performance states is a reduced factor (or may even be eliminated).

Each component of the system may be included in a performance domain, and each performance domain may include at least one component but may include multiple components, in various embodiments. The power management unit may be programmable with performance state identifiers for each performance domain, and for each hardware-managed transition (e.g. into the sleep state, out of the sleep state, or both into and out of the sleep state, in various embodiments). The sleep state of the processor may also be a performance state, as may various other performance states that the processor may be programmed to in various embodiments.

BRIEF DESCRIPTION OF THE DRAWINGS

The following detailed description makes reference to the accompanying drawings, which are now briefly described.

Figure 1:
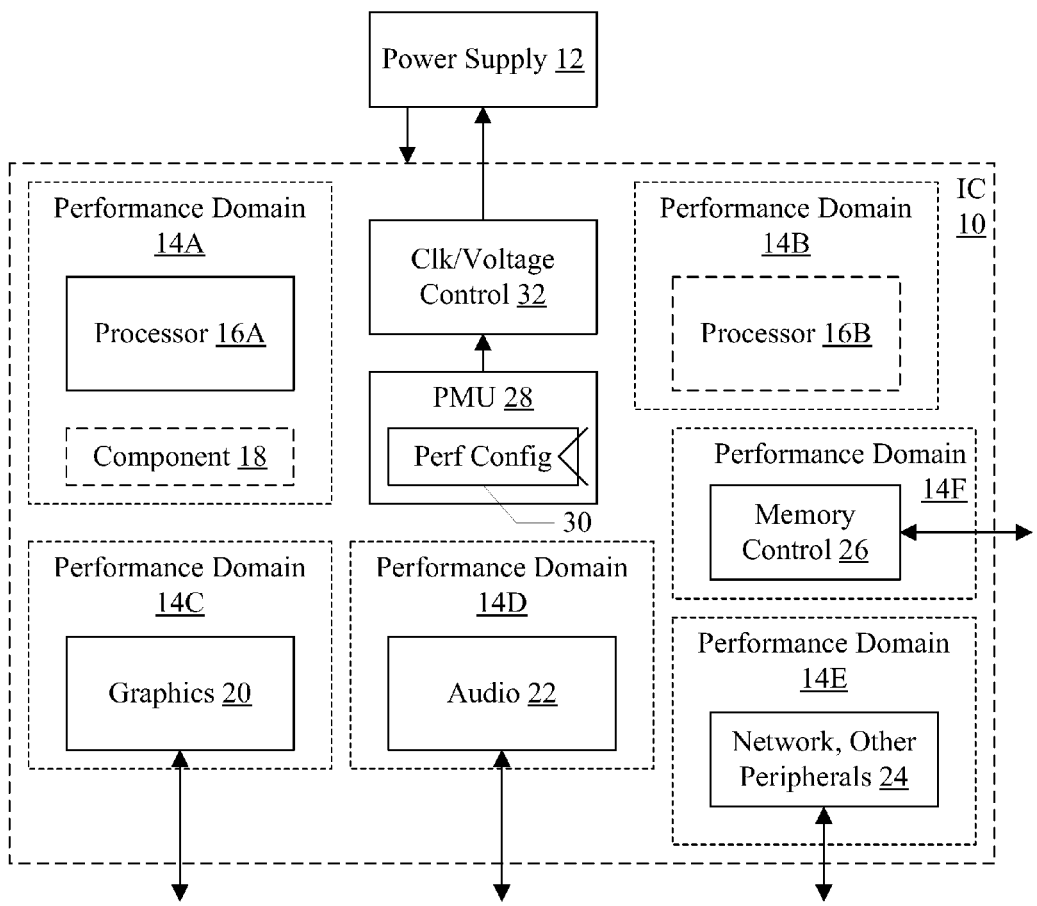
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of a system is shown. In the embodiment of FIG. 1, the system includes an integrated circuit (IC) 10 forming a system on a chip, and a power supply 12. The integrated circuit 10 includes a set of performance domains 14A-14F. Each performance domain 14A-14F includes at least one component of the integrated circuit 10, and a given performance domain may include more than one component. For example, the performance domain 14A in FIG. 1 includes two components, a processor 16A and another component 18; and the performance domain 14E may include two or more peripherals 24. In the illustrated embodiment, the performance domain 14B includes an optional second processor 16B; the performance domain 14C includes a graphics unit 20; the performance domain 14D includes an audio unit 22; the performance domain 14E includes networking peripherals and/or other peripherals and/or peripheral interface units 24; and the performance domain 14F includes a memory controller 26. The integrated circuit 10 also includes a power management unit (PMU) 28 (which includes one or more performance configuration registers 30) and a clock/voltage control unit 32. The various components shown in FIG. 1 may be coupled in any desired fashion. For example, there may one or more buses or other interfaces between the components. The PMU 28 and the clock/voltage control unit 32 may also be coupled to the various components in addition to being coupled to the interfaces. For example, the clock/voltage control unit 32 may supply clock signals to the components (not shown in FIG. 1). The clock/voltage control unit 32 may be configured to communicate with the power supply 12 to request one or more supply voltages from the power supply 12. The power supply 12 may generate the requested voltage or voltages, and may supply the integrated circuit with the voltages.

The PMU 28 may be configured to control transitions between performance states for the various performance domains 14A-14F. Particularly, the PMU 28 may be configured to automatically transition one or more of the performance domains 14A-14F in response to one or more processors 16A-16B entering a sleep state (or in response to determining that the processor is to enter the sleep state). The PMU 28 may also be configured to automatically transition one or more of the performance domains 14A-14F in response to the processor exiting the sleep state (or in response to determining that the processor is to exit the sleep state). Exiting the sleep state may also be referred to as "waking" the processor. The sleep state and other states of the processors may be performance states of the performance domains that include the processors. Alternatively, the sleep state and other processor states may be performance characteristics in a performance state for the performance domains including the processors.

A performance domain may be one or more components that may be controlled by the PMU 28 as a unit for performance configuration purposes. That is, the PMU 28 may be configured to establish a corresponding performance state for each performance domain, and may be configured to control transitions between performance states in each performance domain. The components that form a performance domain may transition together from one performance state to another performance state. On the other hand, components in different performance domains may be independent of each other, at least from the standpoint of hardware, and may have independently-determined performance states. Some performance domains may be logically linked at a higher level (e.g. in software). For example, the performance domains 14C-14D may be logically linked if a user is watching a video that includes sound (thus using the graphics unit 20 to display the video images and the audio unit 22 to transmit the sound).

The performance state may include any combination of performance characteristics for the components in a corresponding performance domain. A performance characteristic may be any configurable setting for a component that affects the performance of that component. For example, the operating frequency of the clock signal provided to a component may affect its performance. A lower operating frequency may result in lower performance. A corresponding supply voltage may also be a performance characteristic. Some performance characteristics may be component-specific. For example, cache sizes in various caches may be a performance characteristic. A data width or other data transfer rate parameter of an interface may be a performance characteristic. A component that includes a number of symmetrical units that may operate in parallel (e.g. execution units in a processor, pixel pipelines or other image processing pipelines in a graphics unit, etc.) may be configurable as to the number of symmetrical units that are active. A number of instructions (processor), operations (graphics or audio), communications (network or other peripheral interface), or memory request (memory control unit) processed per unit of time may be a performance characteristic. A graphics resolution or size of the color palette (e.g. bits per pixel) may be a performance characteristic. Audio resolution and sample rates may be a performance characteristic. Memory bandwidth may be a performance characteristic. The sleep/wake state of the processor may be a performance characteristic. If components or portions thereof can be power-gated and/or clock-gated, the power and/or clock enables may be performance characteristics. Any parameter that may be changed and that may affect performance may be a performance characteristic in various embodiments.

Changing the performance state in a performance domain may affect the power consumption of the performance domain. Reducing operating frequency and supply voltage have direct effects on power consumption. Reducing cache size may reduce power consumption because a portion of the cache may not be accessed, and even more reduction may be realized if the unused portion may be turned off. Furthermore, reduced cache size may reduce cache hit rates, which may increase memory latency to the consumer. Increased memory latency may reduce activity in the consumer, reducing power consumption. Reduced data transfer widths/rates on interfaces may reduce power consumption through reduced switching. Additionally, reducing the rate at which data is supplied to a consumer may reduce activity in the consumer, which may reduce power consumption in the consumer. Reduced parallel activity in symmetrical units may reduce power consumption through reduced activity, as may reduced instruction or other operation issue rates. Reducing graphics/audio resolution and color palette may reduce the amount of data transferred per image or unit of sound. Reduced memory bandwidth may reduce power consumption in accessing the memory per unit time, and may reduce activity in the consumer.

In some embodiments, the performance state may include multiple instances of a performance characteristic. For example, if the processor is powered off in the sleep state and other components are in the same performance domain, the voltage for the processor may be set separately from the voltage for the other components that remain active. Similarly, any other performance characteristics that apply to more than one component in a performance domain and that may be independent controlled for such components may be represented by multiple instances in the performance state.

In embodiments in which a processor is in a performance domain with other components, the other components may remain active during times that the processor is in the sleep state. For example, the component 18 in the performance domain 14A may remain active during times that the processor 16A is in the sleep state. The performance characteristics of the component may be changed to reflect reduced operation while the processor is in the sleep state. For example, the component 18 may be a level 2 (L2) cache coupled to the processor 16A. In such an embodiment, the L2 cache may not be accessed by the sleeping processor 16A but may remain active to maintain cache coherence. The L2 cache may operate at a lower clock frequency (and voltage) in some embodiments while still providing enough performance to ensure the cache coherence.

The PMU 28 may include circuitry configured to cause the performance state transitions to occur in the performance domains. In one embodiment, the PMU 28 may detect that the processor 16A-16B is entering/exiting the sleep state, and may cause corresponding transitions in the performance domains. In other embodiments, software may explicitly communicate sleep/wake events to the PMU 28. In an embodiment, the PMU 28 is programmable with performance configurations for each performance domain. For example, performance states to be used in the performance domains 14A-14F when the processor is in sleep state may be specified in the performance configuration registers 30. Performance states to be used when the processor 16A-16B exits the sleep state (awakens) may also be specified. When either event occurs, the PMU 28 may cause the desired transitions.

In the case of voltage and clock frequency changes, the PMU 28 may communicate the new settings to the clock/voltage control unit 32. The clock/voltage control unit 32 may implement the new settings, generating the clocks at the requested frequencies and requesting the desired supply voltages from the power supply 12. The clock/voltage control unit 32 may order the modifications, if necessary, to safely make the transitions. For example, if the clock frequency and supply voltage are being increased, it may be safer to increase the voltage first, and then increase the clock frequency because the increased clock frequency may lead to incorrect operation if circuitry is operating more slowly at the current (lower) supply voltage. In some embodiments, the amount of time that elapses in a supply voltage change may be substantially greater than the time to change the clock frequency. If the clock frequency and supply voltage are being decreased, the clock frequency may be reduced first (or the frequency and voltage may be reduced in parallel, since the lower clock frequency may be reached prior to the lower supply voltage in this case).

The clock/voltage control unit 32 may include circuitry to communicate with the power supply 12 to request the desired supply voltages, and may include clock generation circuitry. For example, the clock/voltage control unit 32 may include one or more phase lock loops (PLLs), clock dividers/multipliers, etc. to generate clocks for the components.

The various components included in the integrated circuit 10 may implement any desired functionality. Generally, a component may refer to any circuitry that is defined to perform a specified set of operations in the integrated circuit, and has a defined interface to communicate with other components in the integrated circuit. As illustrated in FIG. 1, exemplary components may include the processors 16A-16B, the component 18, the graphics unit 20, the audio unit 22, the networking peripheral and other peripheral/peripheral interfaces 24 (which may be multiple components), and the memory controller 26.

The processors 16A-16B may implement any instruction set architecture, and may be configured to execute instructions defined in that instruction set architecture. Any microarchitectural implementation may be used (e.g. in order, out of order, speculative, non-speculative, scalar, superscalar, pipelined, superpipelined, etc.). Microcoding techniques may be used in some embodiments, in combination with any of the above.

As mentioned above, the performance state of the processors 16A-16B may include a sleep state. In the sleep state, the processor is idle (not executing instructions). The clock to the processor may be stopped. In some embodiments, power may also be removed from the processor in the sleep state. Alternatively, there may be more than one sleep state. One of the sleep states may include powering down the processor, and another sleep state may include retaining power to the processor. Additionally, the processor may include at least one "awake state". There may be multiple awake states. For example, different supply voltage/operating frequency combinations may be supported, different combinations of enabled execution units may be supported, different instruction issue rates may be supported, etc.

The graphics unit 20 may include any circuitry involved in the display of images on a display device for, e.g., user viewing. The images may be static images, or may be part of a video. The graphics unit 20 may include rendering hardware, refresh (of the display device) hardware, video encoders and/or decoders, video compression and decompression units, etc. The audio unit 22 may include any circuitry involved in the playing or recording of sounds in the system. The audio unit 22 may include, e.g., audio encoders and/or decoders, digital signal processors, etc.

The networking peripherals and other peripherals 24 may include a variety of circuitry. For example, the networking peripherals may include a media access controller (MAC) unit for the supported network, as well as physical layer circuitry. The other peripherals may include any other desired peripherals, and/or peripheral interface controllers configured to control off-chip peripheral interfaces such as Peripheral Component Interconnect (PCI), PCI express (PCIe), firewire, Universal Serial Bus (USB), etc.

The memory controller 26 may be configured to access memory devices such as dynamic random access memory devices (DRAM), synchronous DRAM (SDRAM), double data rate (DDR, DDR2, DDR3, DDR4, etc.) SDRAM, low power DDR (LPDDR2, etc.) SDRAM, RAMBUS DRAM (RDRAM), etc. In one embodiment, the memory controller 26 may be configured to interface to one or more memory modules (e.g. single inline memory modules (SIMMs), dual inline memory modules (DIMMs), etc.) that include one or more of the above memories. Accordingly, the memory controller 26 may be configured to communicate on the memory interfaces, to queue memory requests from other components in the integrated circuit 10, and to communicate with the other components to complete the memory operations.

While the embodiment of the integrated circuit 10 shown in FIG. 1 includes numerous performance domains, more or fewer performance domains may be supported. For example, a single performance domain may be supported, or two performance domains may be supported (e.g. one domain including the processors 16A-16B and another domain including the remaining components 18, 20, 22, 24, and 26). One or more processors 16A-16B may be included in a performance domain with any subset of the components 18, 20, 22, 24, and 26. Any combination of performance domains and components included in those domains may be implemented in various embodiments.

Other embodiments of the integrated circuit 10 may include other combinations of components, including any subset of the illustrated components with or without other components, supersets with other components, etc. Additionally, while the illustrated embodiment illustrates the components 16A-16B, 18, 20, 22, 24, and 26 all included in the integrated circuit 10, other embodiments may implement the components as two or more integrated circuits. Any level of integration or discrete components may be used.

Figure 2:
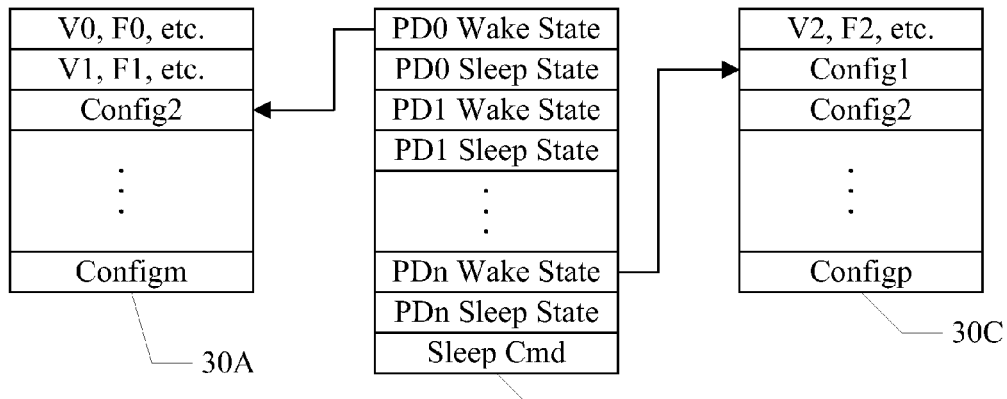
FIG. 2 is a block diagram of one embodiment of performance configuration registers illustrated in FIG. 1.

Turning now to FIG. 2, a block diagram illustrating one embodiment of the performance configuration registers 30 is shown. In the illustrated embodiment, the registers 30 include register set 30A, register set 30B, and register set 30C. The register set 30B may include a configuration for each performance domain, and for the sleep state and the wake state. Accordingly, the illustrated set supports up to "n" performance domains, where "n" is a positive integer. The sleep state for a given performance domain indicates the performance state for the domain in response to the processor entering the sleep state. The wake state for the given performance domain indicates the performance state for the domain in response to the processor exiting the sleep state.

In some embodiments, the registers 30B may directly store values defining the performance state to be established in the corresponding power domain. In such cases, the software preparing the integrated circuit 10 for a sleep state of the processors 16A-16B may program each register 30B for the sleep state and the following wake state according to the activity in the system.

In the illustrated embodiment, the registers 30B may store pointers to register sets 30A or 30C, where the set of registers to which the pointer is referenced is dependent on the performance domain corresponding to that register. In some embodiments, there may be register sets similar to 30A or 30C for each performance domain. Alternatively, similar performance domains may share register sets. For example, if the processor performance domains 14A and 14B are the same in terms of the performance characteristics that may be changed, the performance domains 14A-14B may share the same registers sets 30A or 30C. Each register set 30A and 30B may store performance state configurations for the corresponding performance domain. Accordingly, software may program a set of performance states in the register sets 30A or 30C, and then select an appropriate performance state for both the sleep transition of the processor and the wake transition of the processor prior to transitioning the processor into the sleep state. The selection may be made by writing the pointer in each register corresponding to the performance domain in the registers 30B. Accordingly, the performance states may be dynamically modified based on activity in the system before each sleep state transition.

Providing performance state configurations for the wake state of the processor may permit various performance domains to automatically transition to a performance state that is different from the performance state of the performance domain prior to the processor entering the sleep state. Thus, for example, if software can predict the operations that may be performed when the processor awakens, a performance state that is desirable for those operations may be established even in the case that the wake performance state is different from the performance state prior to the processor transitioning to the sleep state.

In some embodiments, the registers 30B may include a valid bit or other indication used to indicate whether or not a transition is to occur in the corresponding performance domain. Thus, a performance domain that is most efficient at a given performance state at all times may be left unmodified by clearing the valid bit. Or, a performance domain that is disabled may be prevented from becoming enabled during a performance domain transition.

The registers 30B may also include a register that may be written by software to indicate that the sleep transition is commencing. The PMU 28 may be configured to monitor for an update to the sleep command register, and may be configured to perform the sleep transition of the processor and the various other performance domain state transitions. Alternatively, software may use processor instruction execution mechanisms to cause the processor to enter the sleep state, and the PMU 28 may be configured to perform other performance domain state transitions.

The PMU 28 may also be configured to monitor for interrupts or other events that will cause a processor to wake up, in order to perform the performance state transitions to exit the performance state. In some embodiments, the PMU 28 may also be configured to monitor processor operation to automatically detect a processor entering sleep state (e.g. without the processor writing a command to a sleep command register).

In some cases, one or more performance domains may be more closely linked with a particular processor in multiprocessor configurations. In such cases, the closely linked performance domains may transition to different performance states in response to the corresponding processor entering the sleep state, while other performance domains that are more closely linked to a still-active processor may not transition. Whether or not performance domains transition may be hardware controlled by the PMU 28, or may be software controlled using the valid indications in the performance configuration registers as described previously. Alternatively, the transitions may be performed when the last of the processors enters the sleep state (while the other processors are already in sleep state) and the transitions for exit from the sleep state may be performed when the initial processor exits the sleep state (e.g. in response to an external interrupt).

The set 30A may store various performance state configurations (up to "m" configurations, where "m" is a positive integer). Thus, for example, various registers in the set 30A may store voltages (V0, V1), operating frequencies (F0, F1), and/or other performance state information for the performance domain 0 (PD0). The register set 30C may also store various performance state configurations (up to "p" configurations, where "p" is a positive integer) for the performance domain "n". The integers n, m, and p need not be equal.

In some embodiments, the integrated circuit may support certain voltage, clock frequency pairs (e.g. there may be a minimum supply voltage to operate at a given clock frequency). While the voltage and clock frequency configurations in the registers 30B and 30C may not violate the minimum supply voltage, in some cases it may be desirable to use a different supply voltage than the minimum. For example, if software predicts that a first clock frequency is the correct frequency to return a performance domain to when the processor exits the sleep state, but a higher clock frequency may be the correct setting if the prediction is wrong, the corresponding voltage in the registers 30B and 30C may be the voltage used for the higher frequency. In this way, if the predicted frequency is incorrect, the supply voltage may already be set to the desired magnitude, reducing delay in making the adjustment to correct the performance state when a misprediction occurs.

Figure 3:
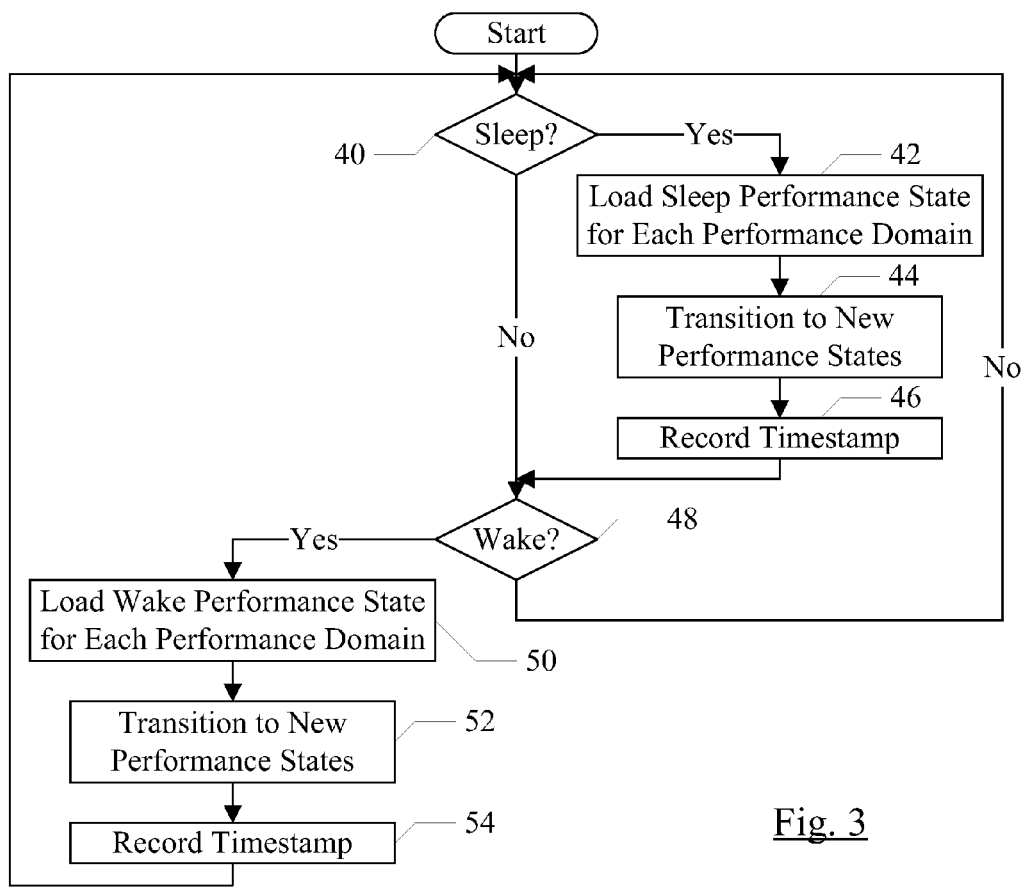
FIG. 3 is a flowchart illustrating operation of one embodiment of a power management unit to automatically change power states.

Turning next to FIG. 3, a flowchart is shown illustrating operation of one embodiment of the PMU 28 and the clock/voltage control unit 32 to manage performance state transitions in performance domains when a processor is entering or exiting a sleep state. While the blocks are shown in a particular order for ease of understanding, other orders may be used. Blocks may be performed in parallel in combinatorial logic in the PMU 28 and/or the clock/voltage control unit 32. Blocks, combinations of blocks, and/or the flowchart as a whole may be pipelined over multiple clock cycles. Particularly, the decision blocks 40 and 48 may be independent and may be performed in parallel or in either order. The PMU 28 and/or the clock/voltage control unit 32 may be configured to implement the operation shown in FIG. 3.

The PMU 28 may detect that the processor is entering (or is about to enter) the sleep state, or that a last processor of a set of processors is to enter the sleep state while the other processors are in the sleep state in some embodiments (decision block 40, "yes" leg). In various embodiments, the detection may occur by monitoring the processors 16A-16B, via receiving a command in the sleep command register, etc. The PMU 28 may load the sleep performance state for each performance domain from the performance configuration registers 30 (block 42). In some embodiments, an indication of whether or not the performance state is valid in the registers 30 may qualify whether or not the performance state is loaded. If the performance state includes supply voltage and/or clock frequency changes, the PMU 28 may supply the values specifying the voltage/frequency to the clock/voltage control unit 32. If the performance state includes other changes (e.g. cache size change, interface size change, etc.), the PMU 28 may transmit the changes to the corresponding component. The PMU 28 and/or clock/voltage control unit 32 may transition the performance domains to the new performance states (block 44). Supply voltage changes may be transmitted to the power supply 12, and time to settle at the new voltage may be given. Clock frequency changes may be programmed into the clock generation circuitry in the clock/voltage control unit 32 and time to settle to the new frequency may be given if needed (e.g. time for a PLL to lock to the new frequency). For other changes, the component may be signalled to switch to the new state. If time is needed to implement the change (e.g. flushing the portion of the cache that is disabled, resetting components on an interface that has changed widths, etc.), such time may be given. In one embodiment, the PMU 28 may record a timestamp (e.g. in a performance configuration register 30 dedicated to store a timestamp) indicating a time at which a performance state transition is completed. Software may capture the timestamp for statistical analysis to determine the effectiveness of power savings measures implemented in the system, for example. The timestamp may be captured in any desired fashion. For example, the system may include a free-running counter that is incremented or decremented at a regular interval. The system may capture the value of the counter as a timestamp.

The PMU 28 may detect that a processor is exiting the sleep state (or is about to exit the sleep state) (decision block 48, "yes" leg). In various embodiments, the detection may occur by monitoring the processors 16A-16B (e.g. detecting an interrupt being delivered to one of the processors). The PMU 28 may load the wake performance state for each performance domain from the performance configuration registers 30 (block 50). Similar to the discussion above regarding loading the sleep performance states, various communications may take place to implement the new performance state configuration. The PMU 28 and/or clock/voltage control unit 32 may transition the performance domains to the new performance states (block 52), and may record a timestamp when the transition is completed (block 54). The timestamp for waking may be recorded in a different register from the timestamp recorded for sleeping, to permit software to capture both timestamps since the processor is sleeping between the timestamp captures.

Figure 4:
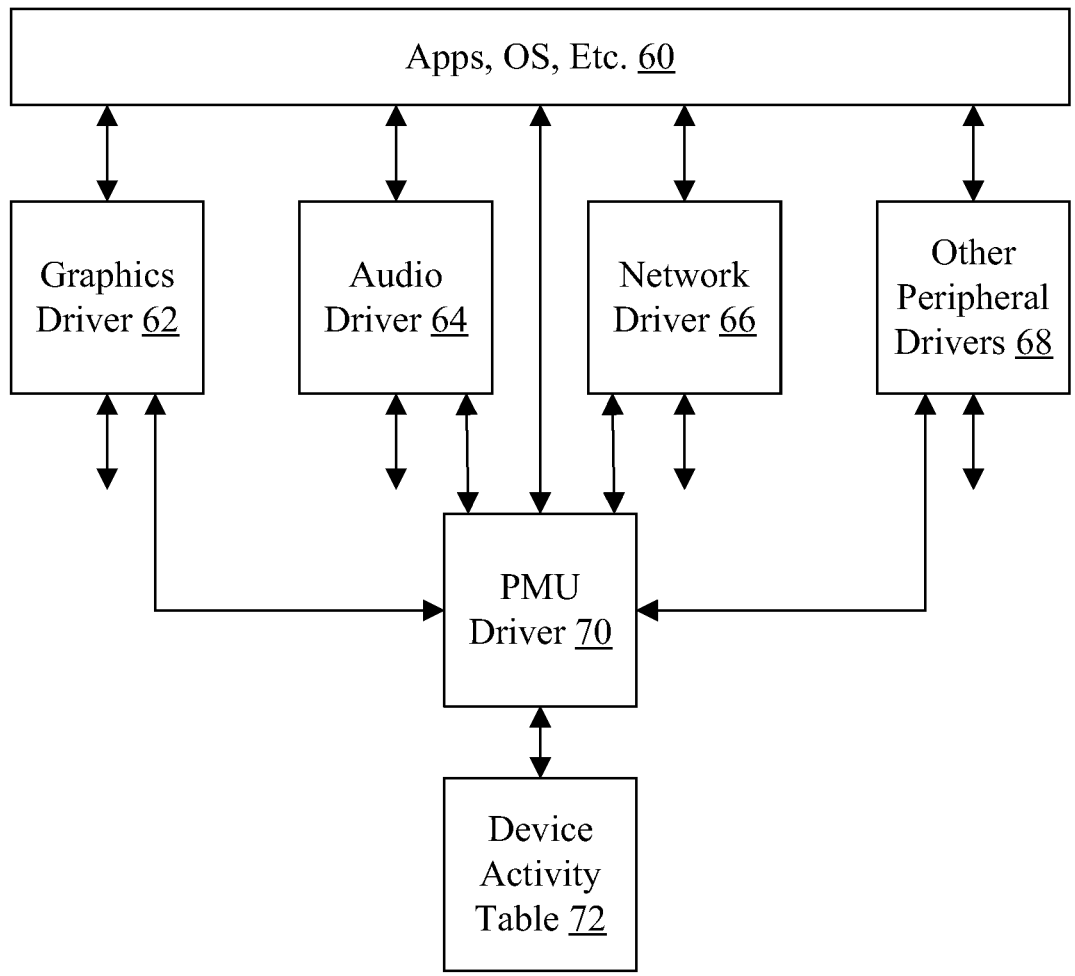
FIG. 4 is a block diagram illustrating one embodiment of driver components.

Turning next to FIG. 4, a block diagram illustrating a software structure which may be implemented in one embodiment of a system is shown. The software may include one or more application programs (Apps), an operating system (OS), and various other software 60. The software 60 may interact with various drivers when using components of the system. For example, a graphics driver 62 may be used for the graphics unit 20; an audio driver 64 may be used for the audio unit 22; a network driver 66 may be used for the networking peripheral 24; other peripheral drivers 68 may be used for other peripherals 24; and a PMU driver 70 may be used for the PMU 28.

Accordingly, if software 60 communicates with the graphics unit 20, the software 60 calls the graphics driver 62, etc. Each of the drivers may communicate with the corresponding components.

Additionally, each of the drivers 62, 64, 66, and 68 may communicate with the PMU driver 70. The PMU driver 70 may monitor the activity in the components driven by the drivers 62, 64, 66, and 68 in a device activity table 72. The monitored activities may include enabling and disabling the corresponding components. The monitored activities may further include changes to other performance characteristics of the unit. Based on the activities being monitored, the PMU driver 70 may select the performance state for each performance domain to be used in the sleep and wake configurations of the performance configuration registers 30. Additionally, other information may be coded into the device activity table (e.g. performance needs of various components when the processor is in the sleep state) which may affect the selected performance states as well.

The software 60 may also directly communicate with the PMU driver 70. For example, in addition to the automatic performance state transitions performed for sleep and wake transitions in the processors, the software 60 may also change performance states directly based on the activity in the system as a whole. That is, even if the processors are not going to the sleep state, changes in the performance state of one or more performance domains may be desirable. The software 60 may directly request such changes.

Figure 5:
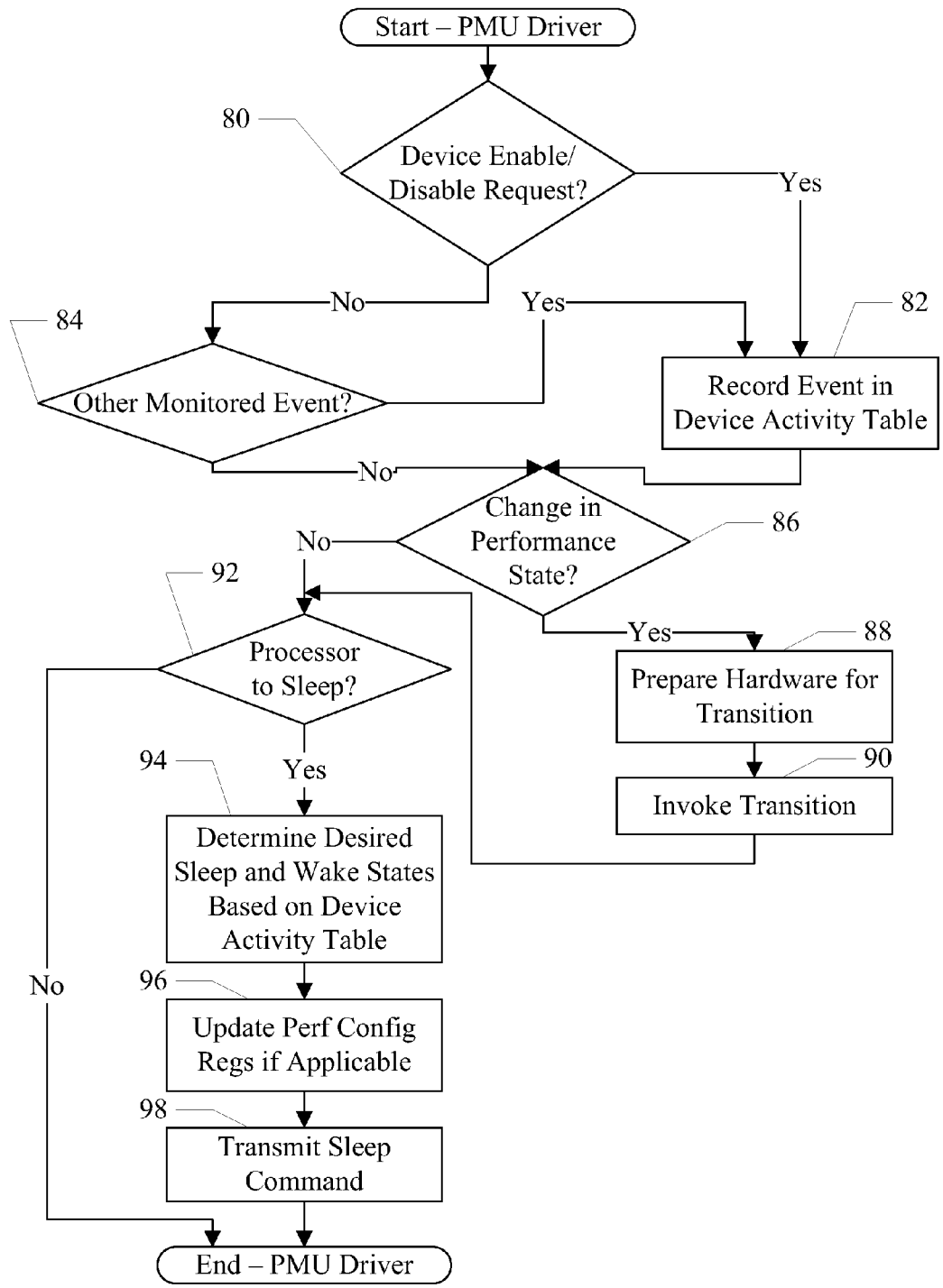
FIG. 5 is a flowchart illustrating operation of one embodiment of a power management unit driver component.

Turning next to FIG. 5, a flowchart illustrating operation of one embodiment of the PMU driver 70 is shown. The PMU driver 70 may include instructions which, when executed on the system, implement the operation described in the flowchart. While blocks are shown in a particular order for ease of understanding, other orders may be used.

If a component driver 62, 64, 66, or 68 receives a device enable or disable request, the driver may transmit the request to the PMU driver 70. The PMU driver 70 may receive the request and (decision block 80, "yes" leg) record the enable or disable event in the device activity table 72 (block 82). In some embodiments, the PMU driver 70 may perform the enable or disable of the devices. In other embodiments, the corresponding component driver may perform the enable/disable and may call the PMU driver 70 to record the event.

In some embodiments, the PMU driver 70 may monitor other events in a given component. The component driver may communicate these events to the PMU driver 70 as well. Upon receipt of such events (decision block 84, "yes" leg), the PMU driver 70 may record the event in the device activity table (block 82).

The PMU driver 70 may determine if the events recorded in the device activity table 72 indicate that a change in performance state for one or more performance domains should be performed. Additionally, the software 60 may directly request a change in one or more performance domains. In either case (decision block 86, "yes" leg), the PMU driver 70 may prepare the corresponding hardware components for the performance state change (e.g. communicating the new performance characteristics—block 88), and may invoke the transition (block 90). Blocks 88 and 90 may thus represent a software-controlled performance state transition for one or more performance domains.

The PMU driver 70 may further detect that a processor is preparing to enter the sleep state (decision block 92, "yes" leg). The PMU driver 70 may determine the desired sleep and wake states for the performance domains based at least on part of the device activity table 72 (block 94). The PMU driver 70 may update the performance configuration registers 30 to select the performance states, if needed (block 96), and may transmit the sleep command to the PMU 28 to cause the performance state transitions (e.g. writing the sleep command register in the PMU 28) (block 98). Other embodiments may detect the processor entering the sleep state directly, and may cause the performance state transitions based on that detection. Such embodiments may eliminate block 98.

Accordingly, blocks 94 and 96 may represent programming the PMU 28 with performance states for performance domains, for both sleep and wake state transitions in the processor(s).

System and Computer Accessible Storage Medium

Figure 6:
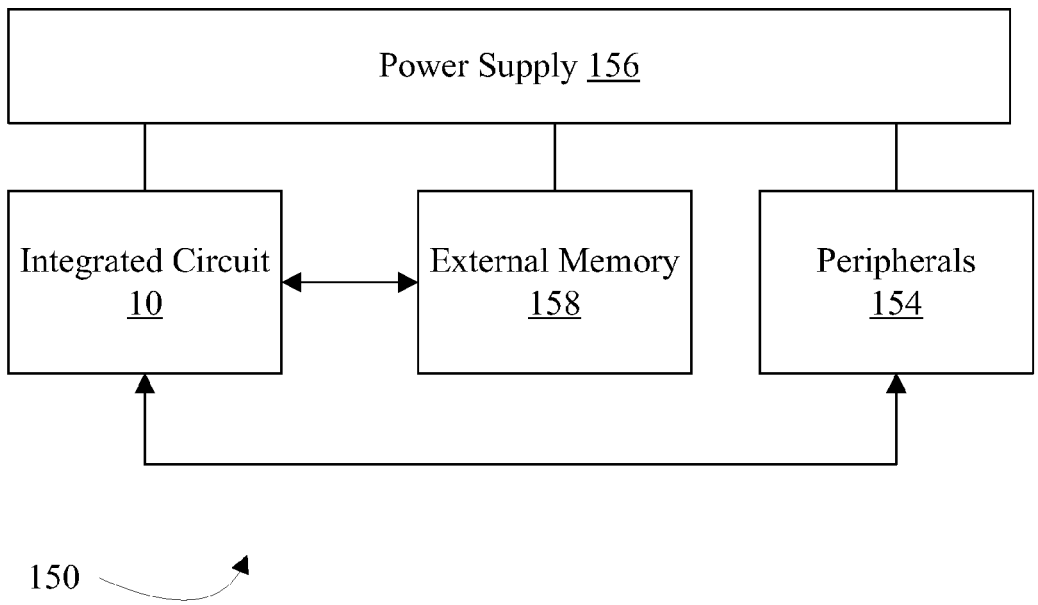
FIG. 6 is a block diagram illustrating another embodiment of a system.

Turning next to FIG. 6, a block diagram of one embodiment of a system 150 is shown. In the illustrated embodiment, the system 150 includes at least one instance of an integrated circuit 10 (from FIG. 1) coupled to one or more peripherals 154 and an external memory 158. A power supply 156 is also provided which supplies the supply voltages to the integrated circuit 10 as well as one or more supply voltages to the memory 158 and/or the peripherals 154. The power supply 156 may include the power supply 12 shown in FIG. 1, for example. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc.

Figure 7:
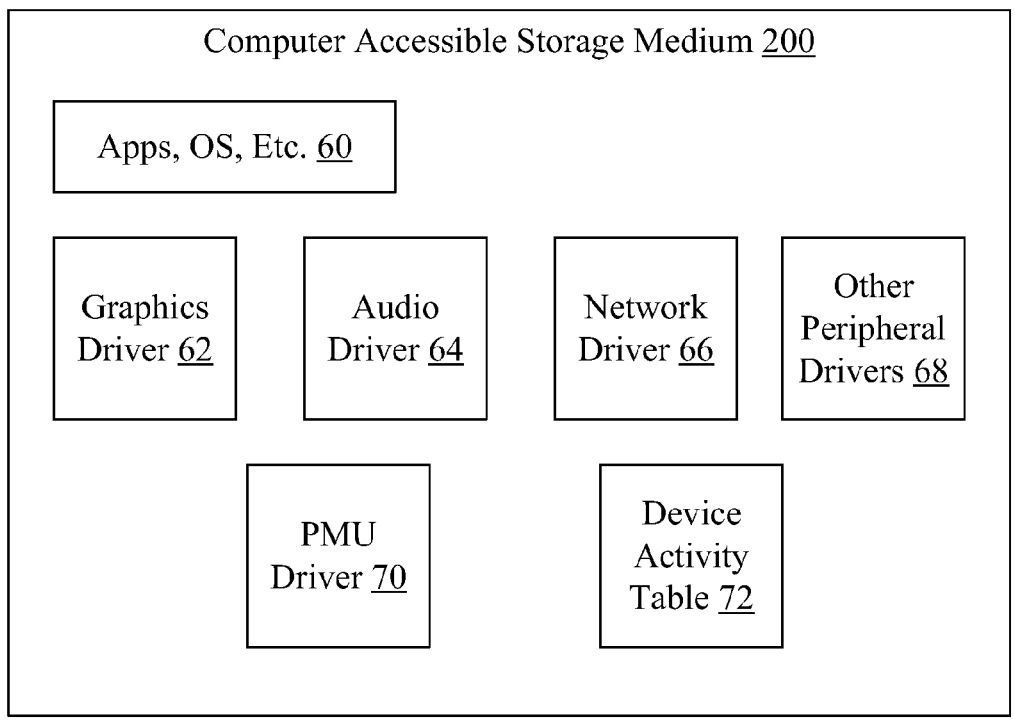
FIG. 7 is a block diagram of one embodiment of a computer accessible storage medium.

Turning now to FIG. 7, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 7 may store one or more of the software 60, the graphics driver 62, the audio driver 64, the network driver 66, the other peripheral drivers 68, the PMU driver 70, and/or the device activity table 72. The PMU driver 70 may include instructions which, when executed, implement the operation described above with regard to FIG. 5. Generally, the computer accessible storage medium 200 may store any set of instructions which, when executed, implement a portion or all of the operation shown in FIG. 5. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   at least one processor;
   one or more registers programmable to indicate one or more performance states; and
   a control circuit coupled to the one or more registers and the processor, wherein the control circuit is configured to detect that the processor is entering a sleep state, and wherein the control circuit is configured to change a performance state of at least one performance domain in the integrated circuit to a first performance state of the one or more performance states in response to the processor entering the sleep state, and wherein the control circuit is configured to detect that the processor is exiting the sleep state, and wherein the control circuit is configured to change the performance state of at least one performance domain in the integrated circuit to a second performance state of the one or more performance states in response to the processor exiting the sleep state, and wherein the second performance state differs from a third performance state that was in effect prior to the processor entering the sleep state.

2. The integrated circuit as recited in claim 1 wherein the at least one performance domain includes the processor.

3. The integrated circuit as recited in claim 1 wherein the control circuit is configured to record a first timestamp indicating a time at which the change to the first performance state is completed, and wherein the control circuit is configured to record a second timestamp indicating a time at which the change to the second performance state is completed.

4. A non-transitory computer accessible storage medium storing a plurality of instructions which, when executed:
monitor activity in a plurality of components of a system, wherein the components are included in one or more performance domains, and wherein the system comprises at least one processor;
program a plurality of registers corresponding to one or more performance domains of a system to indicate a first performance state for a first performance domain of the one or more performance domains, wherein the system is to establish the first performance state for the first performance domain responsive to the processor entering a low performance state; and
program a second plurality of registers corresponding to the one or more performance domains of the system to indicate a second performance state for the first performance domain, wherein the system is to establish the second performance state for the first performance domain responsive to the processor exiting the low performance state, and wherein the first performance domain includes the processor, and wherein the first performance state differs from a third performance state of the first domain prior to the processor entering the low performance state.

5. The non-transitory computer accessible storage medium as recited in claim 4 wherein the plurality of instructions are executed responsive to a request to activate a first component of the plurality of components, and wherein monitoring the activity includes recording an indication of the activation of the first component.

6. The non-transitory computer accessible storage medium as recited in claim 5 wherein the plurality of instructions are executed responsive to a request to deactivate the first component, and wherein monitoring the activity includes recording an indication of the deactivation of the first component.

7. The non-transitory computer accessible storage medium as recited in claim 4 wherein the first performance domain corresponds to one or more components that are active during a time that the processor is in the low performance state.

8. An apparatus comprising:
a plurality of components, each component included in one of a plurality of performance domains; and
a power management unit configured to establish a performance state in each of the plurality of performance domains, and wherein the power management unit is configured to transition at least a first performance domain of the plurality of performance domains to a first performance state programmed into the power management unit responsive to a processor transitioning to a wakeup state, wherein the processor is transitioning from a sleep state, and wherein the wakeup state is different from a prior performance state at which the processor was operating prior to entering the sleep state.

9. The apparatus as recited in claim 8 wherein the power management unit is configured to transition each of the performance domains into a respective power state programmed into the power management unit responsive to the processor transitioning to the different performance state.

10. A method comprising:
a processor entering a sleep state in a system;
a power management unit causing a performance domain of the system to transition to a first performance state to operate during a time that the processor is in the sleep state, wherein the first performance state is programmable in the power management unit;
determining the first performance state to program into the power management unit responsive to monitoring operation of the system;
the power management unit detecting that the processor is exiting the sleep state; and
the power management unit further causing the performance domain to transition to a second performance state to operate subsequent to the processor exiting the sleep state, wherein the second performance state is programmed in the power management unit, wherein the second performance state is different from a third performance state for the performance domain prior to the processor entering the sleep state.

11. The method as recited in claim 10 further comprising:
continuing to monitor the system; and
reprogramming the power management unit with a fourth performance state responsive to the continued monitoring.

* * * * *